United States Patent [19]

Moyroud

[11] 4,162,846

[45] Jul. 31, 1979

[54] PHOTOGRAPHIC TYPE COMPOSING MACHINE AND METHOD

[76] Inventor: Louis M. Moyroud, 202 Grove Way, Delray Beach, Fla. 33444

[21] Appl. No.: 617,847

[22] Filed: Sep. 29, 1975

[30] Foreign Application Priority Data

Oct. 1, 1977 [GB] United Kingdom ............... 42636/77

[51] Int. Cl.$^2$ ............................................... G03B 23/00

[52] U.S. Cl. ........................................ 354/10; 354/13; 354/15

[58] Field of Search ........................ 354/5, 6, 7, 9, 10, 354/12, 13, 14, 15, 18, 19; 355/40, 41, 42, 43, 56

[56] References Cited

U.S. PATENT DOCUMENTS

| | | | |
|---|---|---|---|
| Re. 25,128 | 2/1962 | Hooven et al. | 354/7 |
| 3,590,705 | 7/1971 | Moyroud | 95/4.5 |
| 3,602,116 | 8/1971 | Moyroud | 354/15 X |
| 3,693,516 | 9/1972 | Aron et al. | 354/15 X |
| 3,695,156 | 10/1972 | Moyroud | 354/9 |
| 3,792,482 | 2/1974 | Nielson | 354/6 |
| 3,836,918 | 9/1974 | Rosenstein et al. | 354/15 X |
| 3,946,294 | 3/1976 | Scholten | 354/10 X |
| 3,947,116 | 3/1976 | Dewaele | 355/40 |
| 3,947,661 | 3/1976 | Silverman et al. | 355/42 X |

FOREIGN PATENT DOCUMENTS 1529739 6/1968 France .

OTHER PUBLICATIONS

"The Seybold Report", vol. 3, No. 1, Sep. 9, 1973.

*Primary Examiner*—Michael L. Gellner
*Attorney, Agent, or Firm*—Curtis, Morris & Safford

[57] ABSTRACT

Style changes, size changes and character spacing all are accomplished by the use of a single drive motor. This is done by providing style-changing and size-changing means which are operable by relative movement in the same direction as the character spacing mechanism, and selectively coupling and uncoupling the style-changing or size-changing means to the character spacing mechanism. To this end, a preferably linear array of small, short focal-length projection lenses is provided, so that linear movement of the array relative to the spacing mechanism will produce style and/or size changes, whereas movement relative to the photographic film will produce character spacing.

44 Claims, 17 Drawing Figures

Row Value
Lens Values
Position Zero

PHOTOGRAPHIC TYPE COMPOSING MACHINE AND METHOD

The present invention relates to photographic type composing machines and methods and more particularly to means and methods for projecting and spacing characters of various styles and sizes along a line on a radiation-sensitive surface such as a photographic film.

One of the most important advantages of photocomposition resides in its capability of producing character images of different sizes from the same matrix. One way in which this is done in prior photocomposition equipment is to use projection lenses to magnify the images received from the matrix, and to vary the magnification. In some prior machines this is done by using one of a plurality of different lenses, each of a different magnification ratio. In other prior machines, variable magnification is provided by zoom lenses or the like.

In some of these prior machines the characters are spaced on the photographic film by moving the projection lens or a reflector system relative to the stationary film and character matrix. In other machines the projection lens and film are stationary while the character matrix moves to provide character spacing.

With such prior systems there is a problem in that the focal lengths of the projection lenses usually must be relatively long. This usually means that the lens must have a relatively wide aperture and angular coverage. This adds considerably to the size and expense of the lens. The usual result is that the lens holders or turrets used to change lenses, and the associated motors, electrical power supply and control system must be correspondingly large and expensive. This also greatly influences the size and cost of the remainder of the machine.

Another problem with such prior systems is that the intensity of light reaching the film varies considerably over the length of a line of characters, unless the line is very short. This either limits the line length the machine can compose, or make it ncessary to use expensive compensation means.

A further problem with such prior systems is that most of the light transmitted through the lenses is offaxis; that is, it is not directed on or parallel to the central axis of the lens. This makes it necessary to use expensive corrected lenses in order to avoid serious reductions in the quality of the type composition.

In some prior devices a further problem is that a complex mechanism is needed for changing lenses or refocusing a lens system when making size changes.

A major problem with most prior machines which are capable of changing both styles and sizes of characters rapidly is their complexity. This complexity has kept the cost of such machines relatively high, and has increased their maintenance costs.

It is an object of the invention to provide a photocomposing machine and method which avoids the foregoing problems, and which is relatively simple and inexpensive. It is a further object to provide such a machine which is compact and versatile; one which is capable of mixing both styles and sizes of type composition, but without the usual complexity of construction. It is another object of the invention to provide such a machine and method which is capable of producing type composition with relatively high quality.

The foregoing objects are met by the provision of a photocomposing machine and method in which a character matrix and projection lens carrier are selectively coupled together or disengaged from one another in order to change the size and/or style of characters being composed, or to space characters on a recording surface. This permits the use of a single drive motor to provide the three separate functions of character spacing, style changing, and size changing.

Preferably, during type composition, the character matrix and lens carrier move, as a unit, relative to a photosensitive surface (e.g. photographic film) to space characters on the film.

The foregoing simplifications reduce the size and cost of the mechanical and electrical parts of the machine, and they permit the use of small, relatively inexpensive projection lenses and a compact, simple optical system to help achieve the objects of the invention.

A preferred embodiment of the invention comprises one or more of the following features. For example, the feature of having a single accurate spacing device to:

1. Space characters along a line of text.
2. Select one of a number of styles or type faces.
3. Select one of a number of lenses or point sizes.

Another such feature is the provision in a photocomposing machine of an interchangeable "lens pack"; that is, a package of projection lenses of relatively small dimensions which easily can be exchanged with another "lens pack" to change the selection of type sizes available in the machine.

Another feature is the provision, in a photocomposing machine, of a group of lenses of different focal lengths arranged in a line parallel to the line of composition.

Another feature is the provision of an aperture mask attached to a "lens pack" to make it possible to select one style at the exclusion of others.

Another feature is the provision, in a photographic type composing machine, of a rotating character matrix mounted on a first carriage movable in discrete increments during the composition of a line together with an array of lenses mounted on a second carriage supported by said first carriage, but movable in relation with said first carriage to alter the relationship between said first and second carriages. In a machine embodying this feature there may be a locking device to cause the matrix carriage and the lens pack carriage to move in unison or independently.

Another feature is the provision of a small character matrix associated with short focal length lenses arranged to project characters onto a film located at a relatively small distance from the matrix.

Another feature is the provision of a matrix with characters located on a line parallel to the path travelled by a movable lens carriage.

Another feature is the provision, in a photographic type composing machine, of a compact and light matrix disc and lens assembly capable of producing long lines of text comprising different type styles and/or sizes, at relatively high speed under automatic shift controls.

In the preferred embodiment, the invention is applied to a machine having a continuously rotating character matrix such as a disc or a drum, associated with an electronic flashing device, basically as described in U.S. Pat. Nos. 2,790,362; 3,590,705; and 2,775,172. The character matrix carriage is movable by distances proportional to the matrix character width multiplied by an enlargement coefficient, such as explained in U.S. Pat. No. 2,876,687.

As it is apparent from the foregoing discussion, some of the advantages of the invention are as follows:

The machine is relatively small;

The machine is low in cost as compared with other machines of similar performance capabilities;

Smaller and less expensive projection lenses can be used, with the result that the speed of operation and the versatility of the machine are maintained at relatively high levels;

Light rays pass through the lenses on axis, resulting in the production of good quality type composition with less costly lenses;

The optical system for projecting characters is shorter and simpler than in prior machines of comparable capabilities;

The intensity of light reaching the film is uniform throughout the length of even long lines of composition;

The small, lightweight "lens pack" makes it easy to change the type size selection of the machine;

The machine is simpler in construction than prior comparable machines, and is less prone to malfunction, with the result that it costs less to maintain and has less "down-time" than prior machines of comparable performance capabilities.

The foregoing and other objects and advantages of the invention will be set forth in or apparent from the following description and drawings.

In the drawings:

FIG. 1(*a*) is a schematic elevation view of some of the components of FIG. 1 showing their operative locations relative to one another;

Figures 1, 1A, 7, 8:
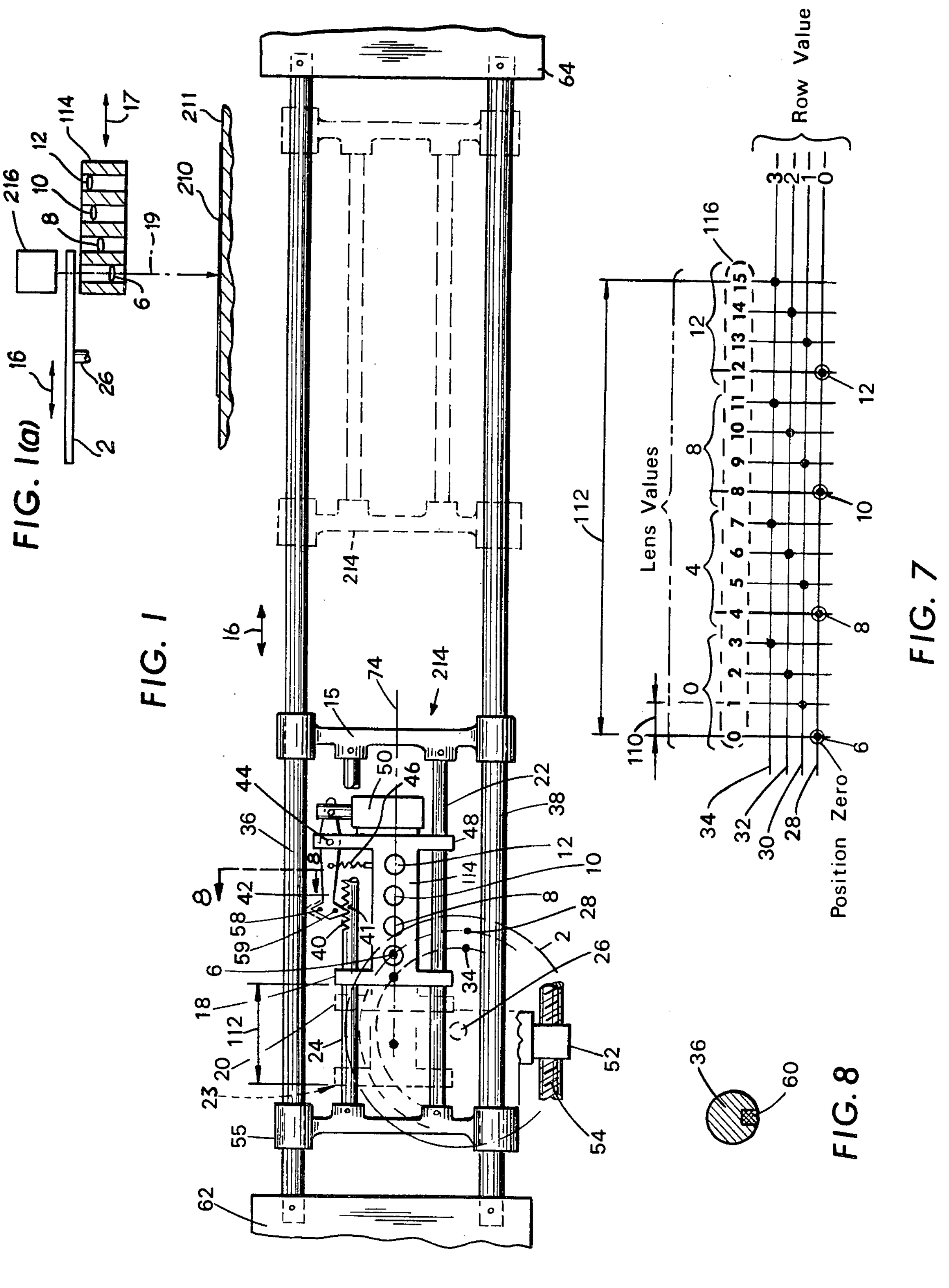
FIG. 1 is a partially schematic plan view of one embodiment of the invention.
FIG. 7 is a diagram illustrating certain operational features of the invention.
FIG. 8 is a cross-sectional view taken along line 8—8 of FIG. 1.

The major mechanical assembly of a machine constructed in accordance with the invention is schematically shown in FIG. 1 of the accompanying drawings. The machine shown in FIG. 1 includes a horizontal matrix disc 2 which can be similar to the disc described in U.S. Pat. No. 3,590,705, and which is attached to a continuously rotating shaft 26. Four concentric rows of transparent characters, generally of different styles, are provided on the disc 2. Two such rows are shown schematically at 28 and 34 in FIG. 1.

FIG. 1(*a*) is a schematic elevation or side view showing the disc 2 in operative relationship to certain other components of the photocomposing machine. The disc 2 is located beneath a flash lamp 216 and above a lens carriage 114 containing four projection lenses 6, 8, 10 and 12. Photographic film 210 rests on a bed plate 211 beneath the lens carriage 114. When the lamp 216 flashes, it sends light along an optical path 19 through a transparent character image on the opaque disc 2. The resulting character image passes through a selected one of the lenses (e.g., lens 6) which magnifies the image and focuses the enlarged image on the film.

As it will be described in greater detail below, the disc 2, the flash lamp 216, and the lens carriage 114 are locked together as a unit and are moved horizontally in the path indicated by arrow 16 during type composition. This produces lines of characters on the film 210 extending parallel to the path 16 of travel of the lens-disc-flash lamp unit.

When it is desired to change the style of type, or the size of type, or both the style and size, the lens carriage 114 is momentarily unlocked from the disc and flash lamp, and is moved relative to the latter elements in a path 17 parallel to the path 16 in order to bring one of the lenses into alignment with a selected row of characters on the disc 2. Then the three components are locked together again, a small correction movement of the lens-disc-flash lamp unit is made, if necessary, and type composition is resumed.

Referring again to FIG. 1, the matrix disc is mounted on a translating carriage 214 provided with two end frames 14 and 15 and slidably mounted on rails 36, 38 secured to the base of the machine through supports 62 and 64.

Carriage 214, also referred to as the "disc-carriage," is movable horizontally along rails 36, 38 in the directions indicated by arrow 16. The disc carriage is moved in increments or steps by a stepping-motor (not shown) which drives a screw 54 engaging a nut 52 attached to the disc-carriage 214. For example, the disc-carriage would be at the left-hand position shown in solid outline at the beginning of the composition of a line, and at the right-hand position indicated in dashed outline at the end of the line.

Mounted on the disc-carriage and normally moving in unison with it is the lens carriage 114 which is slidably attached to the disc-carriage 214 through four projections 48 provided with bushings slidably engaging rods 22, 24 pinned to the frame of the disc-carriage 214 as shown. As shown in FIG. 1, as well as FIG. 1(*a*), the lens carriage can move along its supporting rails in the same directions as the disc-carriage.

Lens carriage 114 is provided with a pawl 42 pivoted at 44 on an arm extending from the lens carriage. The pawl 42, shown as having two opposed teeth 58 and 59, is normally pulled by a spring 46 so that tooth 59 engages one of a series of teeth 41 of a rack section 40 cut out of rod 24. Thus, in normal operation, lens carriage 114 is locked to the disc-carriage through pawl 42 and rod 24. A solenoid 50 is attached to lens carriage 114. Upon energization of this solenoid, pawl 42 is rotated clockwise (as shown in FIG. 1), tooth 59 disengages from rod 24 and the opposite tooth 58 engages a rack 60 (see FIG. 8) inserted into a groove in the inner side of the rail 36. Thus, whenever solenoid 50 is energized, the lens carriage is "frozen" against the fixed rail 36 and any sliding motion imparted to the disc-carriage will not affect the lens carriage, so that the relative positions in space of the two carriages can be altered.

The purpose of this action will now be described. In FIG. 1, lens 6 (for example producing 6 - point type) is opposite character row 28. If it is desired to shift from row 28 (containing, for example, Roman type characters) to row 34 (containing, for example, italic characters) the soleniod 50 is energized, thus releasing the lens carriage from the disc-carriage. Then the disc-carriage is moved by an appropriate distance in the appropriate direction to bring lens 6 opposite the character row 34. The locking solenoid 50 then is released to lock both carriages in their new relative positions. As it is shown in FIG. 1, the several lenses are aligned on line 74 which is parallel to the guide rails of both carriages.

The spacing of teeth 41 conveniently is a multiple of the spacing of the character rows along line 74 and of the spacing of lenses along the line 74. If, instead of shifting from one row (or type face) to another, it is desired to go from 6 point type size to 12 point, the solenoid 50 is first energized to maintain the lens carriage at its present position in space. Then the disc-carriage 214 is moved to the right (as shown in FIG. 1) by the distance separating the center of lens 6 from the center of lens 12 and the value of this displacement is stored in the controlling circuit of the machine, which is to be described below. This operation brings row 28 opposite lens 12. Then the locking solenoid 50 is de-energized so that the lens carriage now is locked to the disc carriage, and both carriages are moved back to the left, in unison, by the same distance the disc-carriage was moved in order to bring lens 12 to the same projecting point as lens 6 at the beginning of the shifting operation.

Thus, the character spacing mechanism including screw 54 and nut 52 is used not only to space characters on the film, but also to accurately and rapidly change the type face (row) and/or the point size (lens) of the characters projected towards the film.

The arrangement of FIG. 1 is shown for illustration purposes only—more detailed representations of the various components of the preferred embodiment of the machine are shown in other figures of the drawings.

Figure 2:
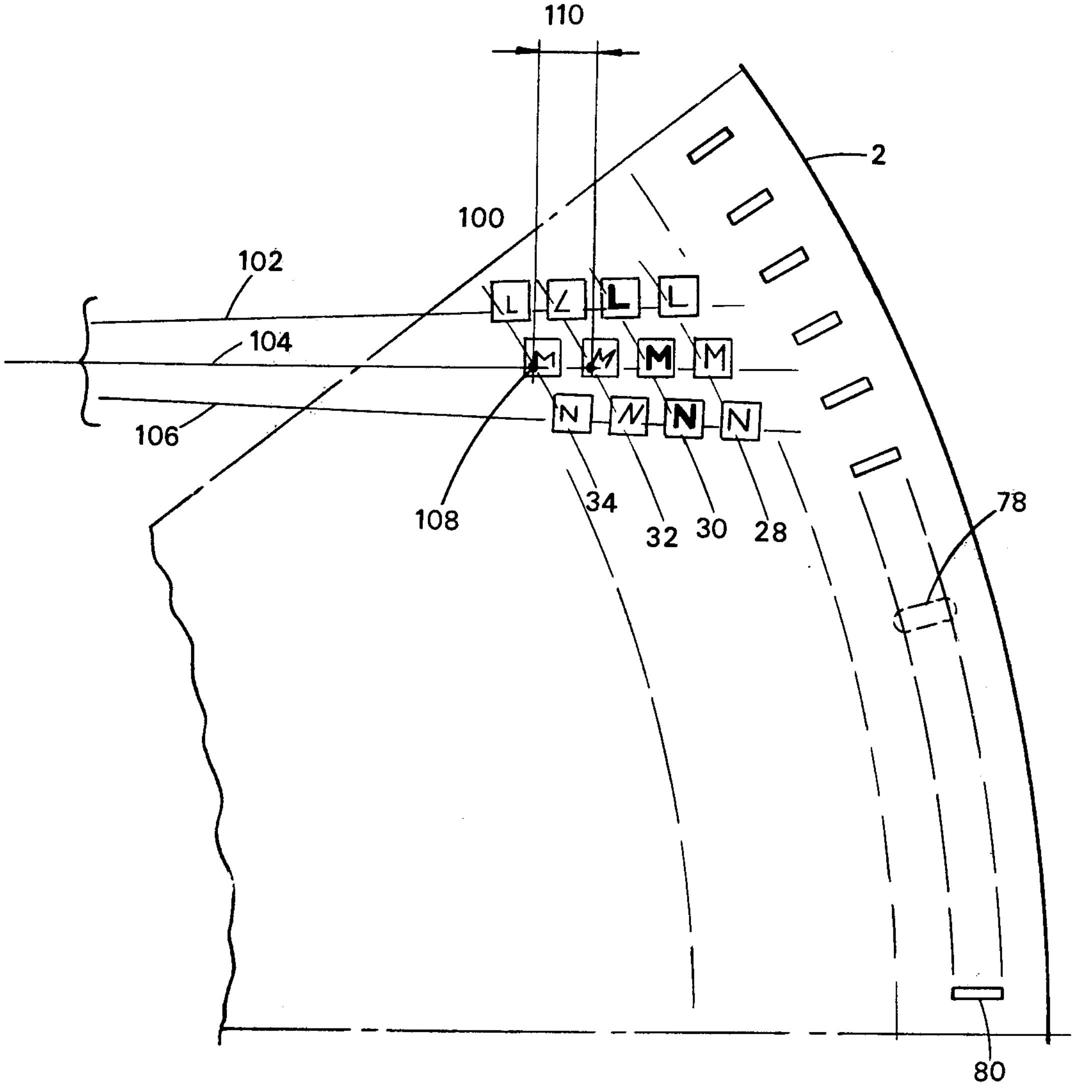
FIG. 2 is an enlarged plan view of a segment of the matrix disc of FIGS. 1 and 1(*a*)

FIG. 2 shows a portion of the matrix disc 2. The disc 2 is provided with timing slits which are used to time the flashes of the flash lamp 216 in the manner explained in U.S. Pat. No. 2,790,362. In the example shown, the disc bears four rows 28, 30, 32 and 34 of characters of different styles. As explained in U.S. Pat. No. 3,291,015 each character is assigned a maximum "character area," and each "reference point" such as 108 of each character area is located on a common circle for each row. The vertical projection of line 74 of FIG. 1 is shown at 104 in FIG. 2. In the position shown in FIG. 2, any of the characters located on line 104 can be projected under the control of their associated timing slits 80. It should be understood that line 104, like line 74, is parallel to the line of composition. All the characters are arranged on lines such as 102, 104, 106 that are tangent to a circle 68 (FIG. 3) concentric with the disc, having a radius equal to the distance from projection line 74 of FIG. 1 to the center of rotation of the matrix disc. The purpose of the special arrangement shown, without alignment of the corresponding characters of the matrix disc rows on radial lines, is to allow enough space for the displacement of the lens carriage. That is, the disc 2 has a hub portion 70 (FIG. 3) forming part of the drive system for spinning the disc. The lens carriage 72 is close to the under-surface of the disc (see FIGS. 1(*a*) and 14), but must not hit the hub 70 during movement to change styles or sizes. Therefore, the diameter of the circle 68 to which line 74 is tangent is larger than that of the hub 70, but smaller than that of the disc 2, and the characters are aligned on the disc accordingly.

Figure 3:
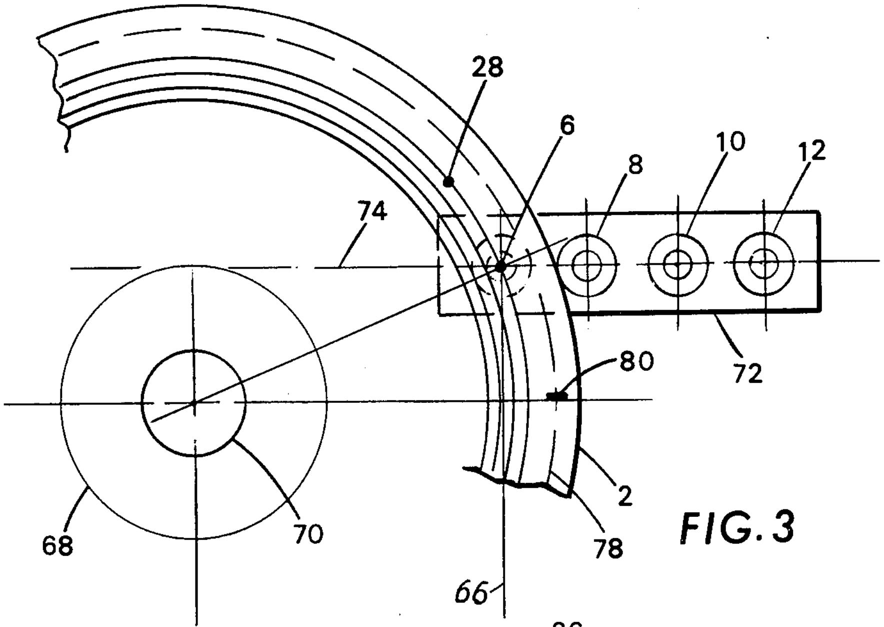
FIGS. 3 through 6 are schematic views of the matrix disc, and other components of the machine of FIGS. 1 and 2, illustrating the changing of type sizes and styles.
Figure 4:
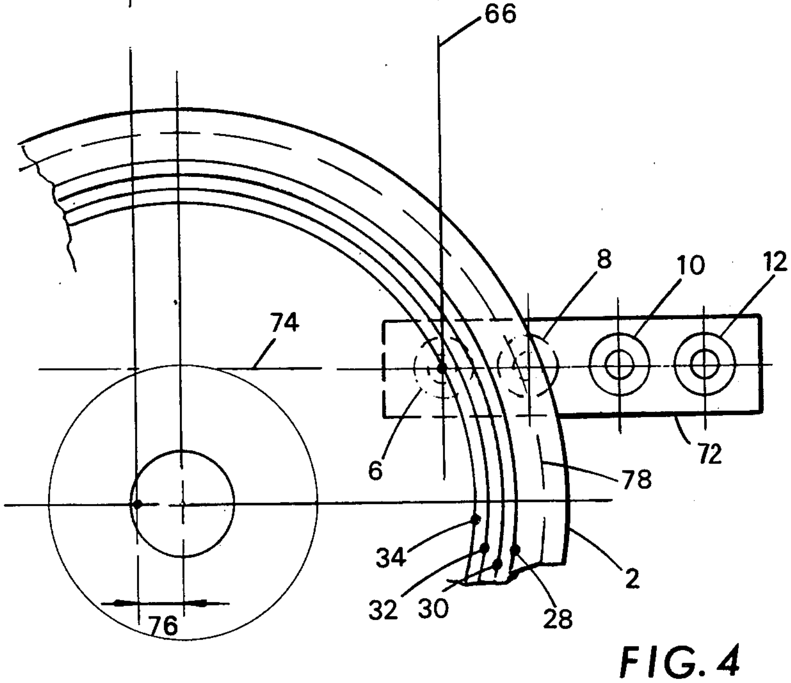

Shifting operations are schematically represented in FIGS. 3 to 6. The lens carriage 114 is indicated schematically at 72 in FIGS. 3 to 6. In FIG. 3 the relative position of the disc lens carriage is such that lens 6 is in position to project characters of row 28. To shift from the outermost row 28 to the innermost row 34, as shown in FIG. 4, the lens carriage is released from the disc-carriage and locked in place so that its position is not changed from that shown in FIG. 3, the disc carriage is moved by a distance 76 (FIG. 4) and the two carriages are locked again. The difference between FIG. 3 and FIG. 4 is that the disc has moved to the right, the projection lens 6 remaining fixed on line 66.

Figure 5:
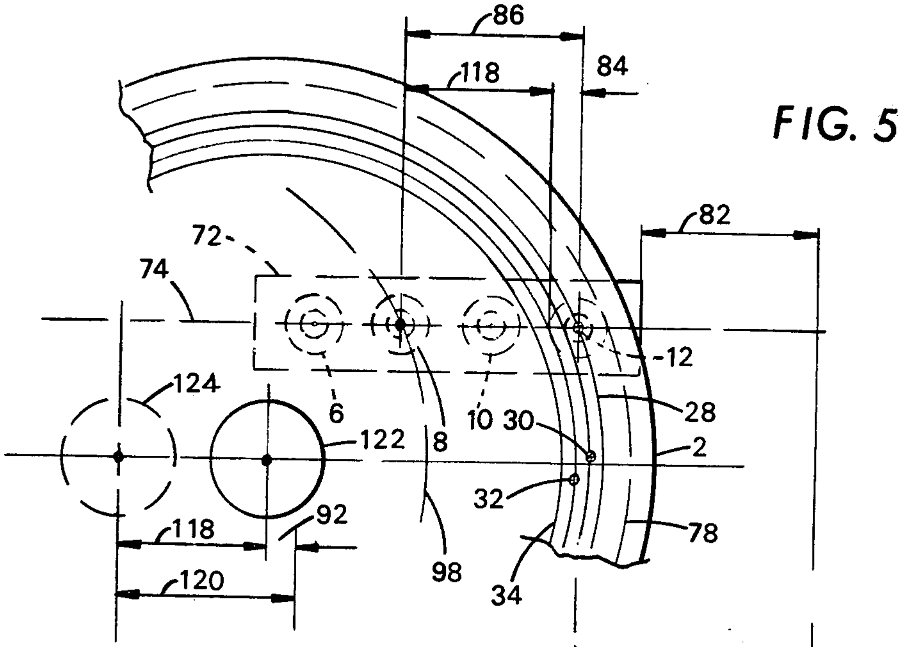
Figure 6:
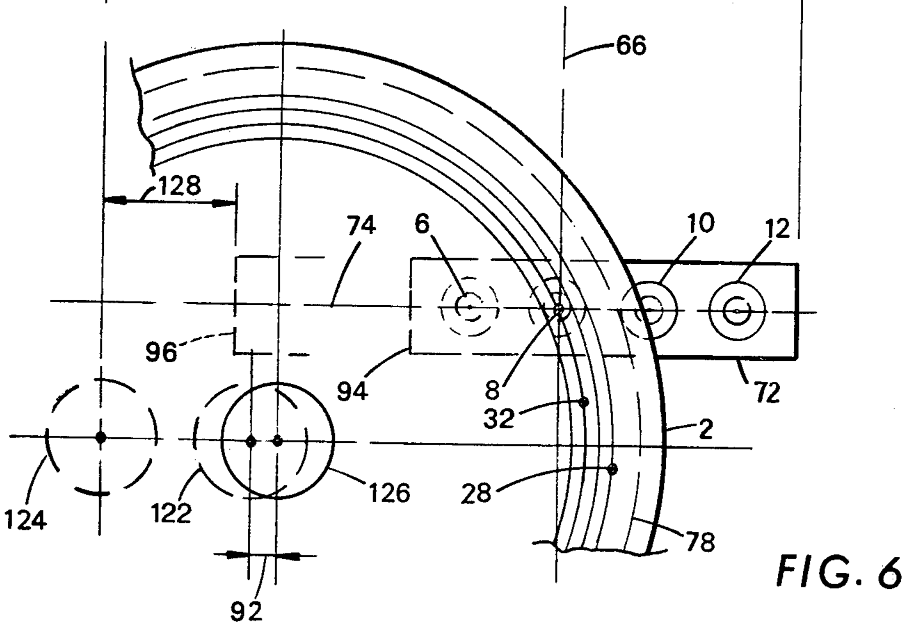

There are cases when it is desired to simultaneously change style and size. Such a case is illustrated in FIGS. 5 and 6. As shown in FIG. 5, the two carriages are positioned for the projection of characters in row 28 through lens 12. Let us now suppose that the next character in a word or line must use lens 8 and row 32. The operational sequence is as follows:

1. Operation of locking solenoid 50 (FIG. 1). This locks the lens carriage to the 2. Operation of the spacing mechanism to move the disc-carriage to the left by a distance 118 (FIG. 5) corresponding to the distance between the previously selected lens (12) and the new lens (8), minus the distance 84 corresponding to the distance between the previously selected row (28) and the new row (32) as measured along line 74. During this first operation of the spacing mechanism the lens carriage is stationary and stays at its initial position shown in FIG. 5. At the end of this operation, the disc hub has moved from position 122 to position 124 and the newly-selected row 32 has moved from its initial position to position 98. At this time, the newly-selected row is on the optical axis of the newly-selected lens, but the optical axis of this lens is at a distance 86 from the projection line 66 (representing, in relation to the stationary film, the location of the next character to be projected), said distance 86 representing the distance between lens 8 and lens 12 as measured along line 74.

3. Release of the locking solenoid 50 to re-establish the mechanical lock between the two carriages at a new relative position where the end 96 of the lens carriage is located at a distance 128 from matrix disc center, as shown in FIG. 6.

4. Displacement of the locked carriages by a distance 120 to the right (FIG. 6) to bring the newly-selected lens 8 to the position previously occupied by lens 12 relative to film. The initial position of the disc hub, its intermediate position and its final position are respectively shown at 122, 124 and 126 in FIG. 6.

It can be seen that by the sequence of operations just described, given as a particular example of a simultaneous change of style and size, the disc carriage has been moved overall to the left (as shown in FIGS. 5 and 6) by a distance mostly determined by the distance between the "new" and "old" lens. However, it can be understood that the rails have to be of a length to allow the disc carriage the extra excursion space to reach to the intermediate position shown. In order to avoid lengthening the rails to accommodate such a lens shift, the sequence of operations can be reversed, depending on the relative position of the carriage along the rails. If we assume that, at the time the shifting described above must occur, the carriages were so close to the left-hand end of the supporting bracket that there would be an interference or that the carriages would not have enough rail space to move to position 124, the sequence of operations would be as follows:

1. Displacement to the right of both carriages by a distance 86 to position lens 8 on the projection axis.
2. Operation of the locking solenoid 50.
3. Displacement to the right of the disc-carriage to bring row 32 onto the projection axis.
4. Release of the locking solenoid.

It now should be clear that the position of the lens carriage relative to the disc-carriage determines both the matrix row and the lens which are in operating position. In other words, both style and size are represented and measured by the displacement or distance of one carriage relative to the other.

In the example of FIGS. 1 through 6, it is assumed that character rows of the matrix disc, as measured along the projection line 74, are spaced by a distance 110 (FIG. 2) equal to the pitch of rack 40 of FIG. 1. If we call this distance one "step," and assume that at position zero the relative position of the disc-carriage and the lens carriage is as shown in FIG. 3, the various relative positions can be represented schematically as shown in FIG. 7. In this figure, vertical lines 116 represent the discrete positions of one carriage in relation to the other. The lens positions are represented by circles 6, 8, 10 and 12. With four different lenses and four different rows, there are sixteen different relative positions, each one, as explained above, corresponding to a given style and given size. The relationship between lenses and rows of FIG. 7 shows that there will never be more than one row opposite one lens. This condition is achieved by spacing consecutive lenses by a distance equal to or greater than the distance 110 between rows, multiplied by the number of rows.

The relative position of lenses and matrix rows of FIG. 7 corresponds to what is shown in solid lines in FIG. 1; lens 6, which is the first lens in the carriage 114, counting from the left end, is in position to project the first row of the disc, counting from the right. This position results in the largest separation, along the line of travel 74, between the lens and disc carriages. The smallest separation will occur when lens 12, which is the last lens of the series, is moved to a positon opposite the last row 34 of the disc, counting from the outermost row. This condition is shown in FIG. 1 when the lens carriage is at the position indicated by dashed lines 23. The maximum displacement of the lens carriage relative to the disc carriage is shown as distance 112. It can be understood that any device which indicates the various relative positions of the carriages can be utilized to represent the style and size being used, as well as the new style and/or size to be used and the correction to introduce in order to properly position the carriages.

"Step" values are chosen as in the following table:

Table I

| | | | | |
|---|---|---|---|---|
| Initial position: | lens 6, | value = Zero | row 28, | value = Zero |
| | lens 8, | value = 4 | row 30, | value = 1 |
| | lens 10, | value = 8 | row 32, | value = 2 |
| | lens 12, | value = 12 | row 34, | value = 3 |

each digit represents one "step" or a displacement equal to the pitch of the locking rack 40 (or distance 110, FIGS. 2 and 7).

The step values for the different lenses and rows are schematically shown in FIG. 7. In this figure, the lens values are represented by vertical lines and the row values by horizontal lines. The figures of groups 116 represent the accumulated lens plus row values.

Figure 15:
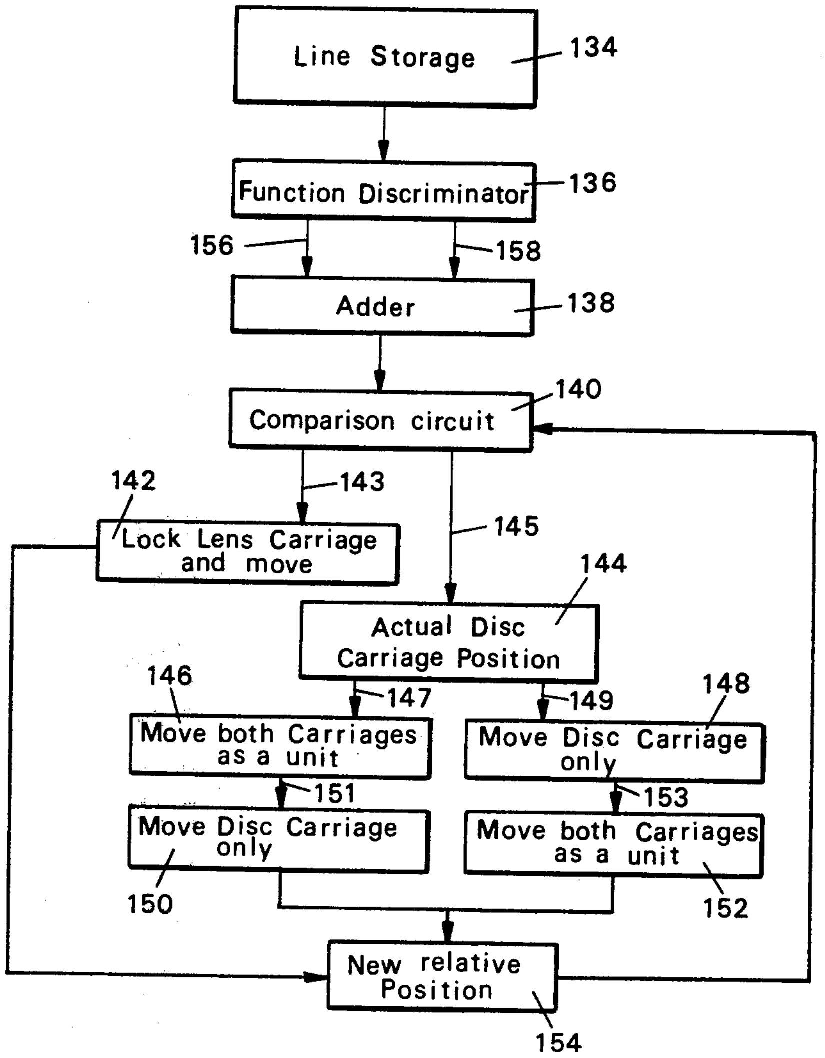
FIG. 15 is a schematic circuit diagram of a control circuit for use in controlling the operation of the device of the invention.

A circuit and flow chart for a program capable of use in a general or special purpose computer for controlling the sequence of shifting operatons is shown schematically in FIG. 15.

In this Figure, block 134 represents a memory in which a line of text, including shift code, has been stored, for example, in the manner described in U.S. Pat. Nos. 3,332,617 or 3,590,705, in the form of machine-recognizable codes. During transcription, the stored codes are read out and shift codes for a change of style and/or size are recognized by a decoder 136, from which two outputs 156 and 158 emerge. Output 156 transfers the row (style) value and output 158 transfers the lens (size) value to an adder block 138, each digit representing one stop 110 of FIG. 7. Positive values can be chosen to represent a displacement to the right and negative values to the left, as a matter of choice. The old and new step values are compared in a comparison circuit 140. If a style shift only is take place, the information as to the new relative position of the two carriages is transferred over a line 143 to a block 142. This causes the relocation of the disc-carriage in relation to the lens carriage to effect the style change.

In the case where a new lens (size shift) has to be selected, information (step values) is transferred over a line 145 to a block 144. The disc-carriage position along the line of text is represented (e.g., by a counter counting the steps of the stepping motor driving the disc-carriage), stored, and, depending on the location of the disc-carriage (whether too near the left end of the guide rails), line 147 or line 149 is energized to first move both carriages (as indicated in block 146) according to a stored value determined in the manner described above, and then move the disc-carriage only, as indicated by line 151 and block 150 or, as indicated by line 149 and block 148, move the disc-carriage only and then both carriages, as indicated by line 153 and block 152. The new "step value" of the carriages is stored as indicated in block 154 to be compared to the new desired value for subsequent shifting operations by means of comparator 140.

In further explanation of the operation of the control circuit of FIG. 15, now consider the example described in relation to FIGS. 5 and 6.

The initial position of the two carriages is such that lens 12, value 12, is opposite row 28, value Zero. The relative position of the carriages is represented by vertical line 12 of FIG. 7. Thus, the previously stored value as indicated in block 154 (FIG. 15) is 12. Now, we want to shift to row 32 and lens 8, as shown in FIG. 6. The code value for the row entered into the adder 138 will be 2 (see FIG. 7 and Table I above) and the code value for the new lens will be 4, the total will be 4 plus 2 equals 6. The difference between the previously-stored value 12 and the new value is positive 6, which means that the spacing between the two carriages must be increased by 6 steps. In addition, after being locked again, the two carriages must move to the right by 8 steps, representing the difference in value between previously used lens 12 (value 12) and the new lens value 4 (of lens 8). This distance is shown at 86 in FIG. 5.

It should be clear from the previous description that, by giving a "step value" to each lens and row, the direction and displacement of one carriage in relation to the other or of both carriages in unison can be determined. In the case of a "style shift" only, that is, in the case where the same lens is to be used for a different type face, the only displacement is the displacement of the disc-carriage relative to the lens carriage. In the case of a lens shift, a relocation of the lens carriage rleative to the disc-carriage takes place followed by a re-positioning of both carriages, moving in unison by a distance representative of the distance between the previously used lens and the newly selected lens.

Reference is made to U.S. Pat. No. 3,731,280 for a typical general purpose computer which easily can be programmed in accordance with FIG. 15 to provide the operation described above. U.S. Pat. No. 3,590,705 shows a wired circuit which also can be used, with the modifications indicated by FIG. 15, to perform the usual photocomposing machine functions (justification, flash timing, etc.) as well as the functions described above. The disclosures of those patents hereby are incorporated herein by reference.

Figure 9:
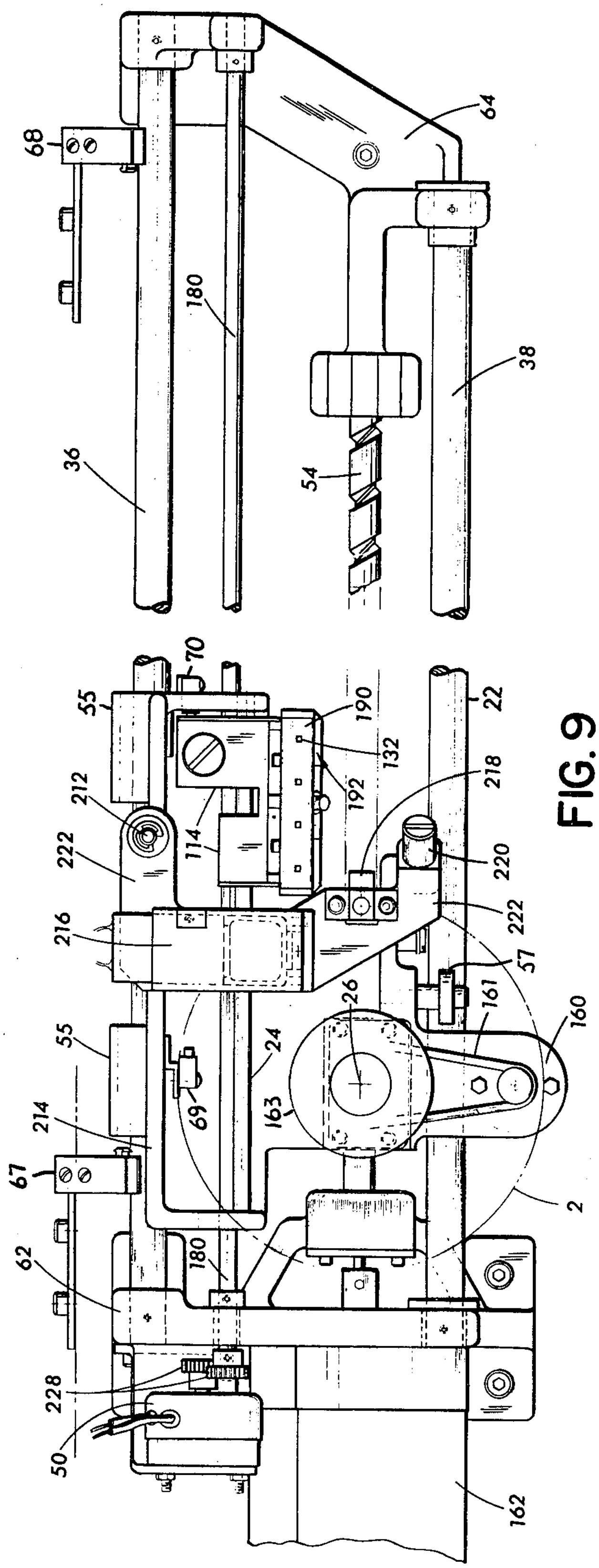
FIG. 9 is a plan view, partially broken-away, of the preferred embodiment of the invention.
Figure 10:
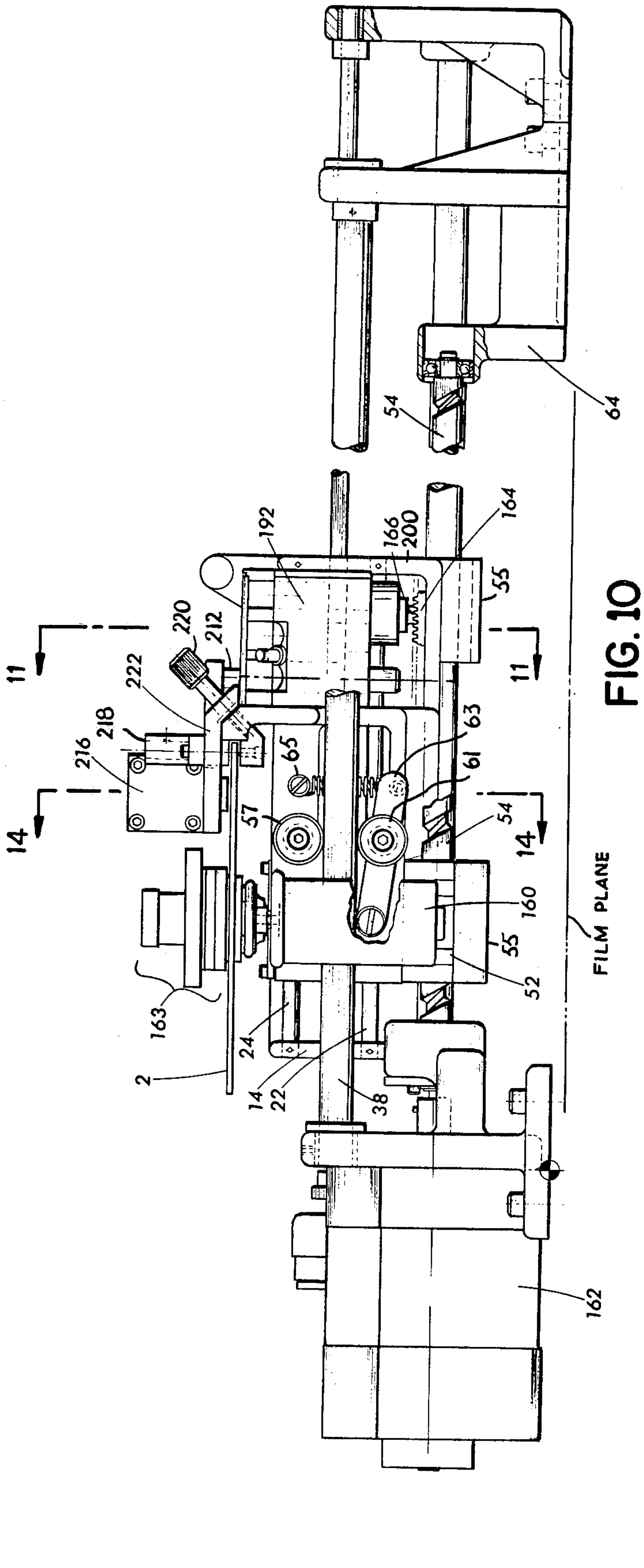
FIG. 10 is an elevation view of the device shown in FIG. 9.

The preferred embodiment of the invention is shown in detail in FIGS. 9 through 14. Components that are the same or similar to components shown in FIG. 1 are represented by identical reference numbers. FIGS. 9 and 10 show, in addition, a stepping motor 162 to operate the screw 54. The screw 54 is supported by ball bearings mounted on the frame 64 (FIG. 10).

The disc-carriage 214 is clearly shown in FIG. 9, as well as the lens carriage 114. The disc carriage 214 is slidably mounted on the rail 36 by means of two sleeve bearings 55. As it is shown most clearly in FIG. 10, the carriage 214 is supported on rail 38 by means of an upper roller 57 and a lower roller 61 which are mounted to roll along the rail 38. The rollers 57 and 61 are urged towards one another by a spring 65 attached to a pivoted arm 63 on which the lower roller is mounted. This provides a stable rolling mounting structure for the disc carriage 214.

Figure 14:
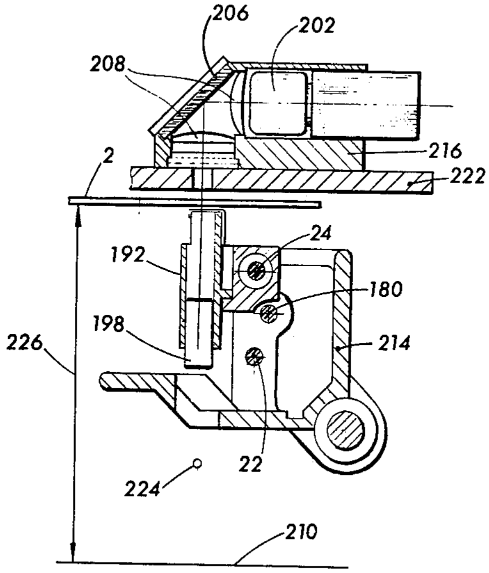
FIG. 14 is a cross-sectional view taken along line 14—14 of FIG. 10.

The matrix disc 2 is attached to a mounting assembly 163 and is rotated, through belt 161, by a motor 160 attached to the disc-carriage. The flash-lamp assembly is shown at 216. The flash-lamp assembly 216 is shown in greater detail in FIG. 14. In FIGS. 9 and 10, the flash lamp assembly is shown at a position to the left of the lens carriage 114 for the purposes of clarity of the drawings. In operation, the unit 216 will be directly over the unit 114, as it is indicated in FIG. 14.

An exciter lamp/photodiode assembly co-operating with the matrix timing slits to produce flash timing signals is shown at 218. The flash lamp and exciter lamp assemblies are attached to an arm 222 pivoted at 212 to the lens carriage 214, so that the assemblies can swing clear of the matrix disc when it is desired to replace the disc in use by another one. The arm 222 is locked in the position shown in FIGS. 9 and 10 by means of a thumbscrew 220 during normal operation of the machine.

Figure 11:
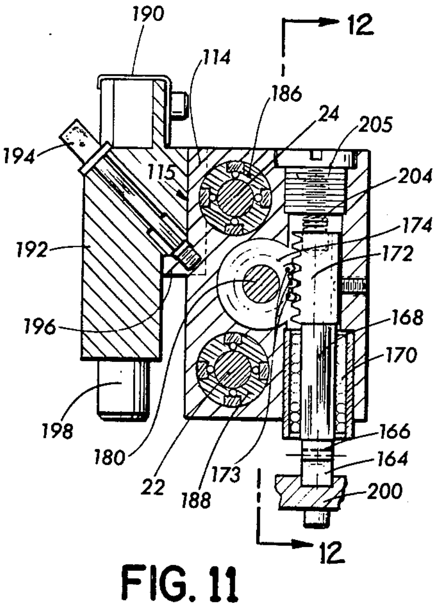
FIG. 11 is a cross-sectional view taken along line 11—11 of FIG. 10.
Figure 16:
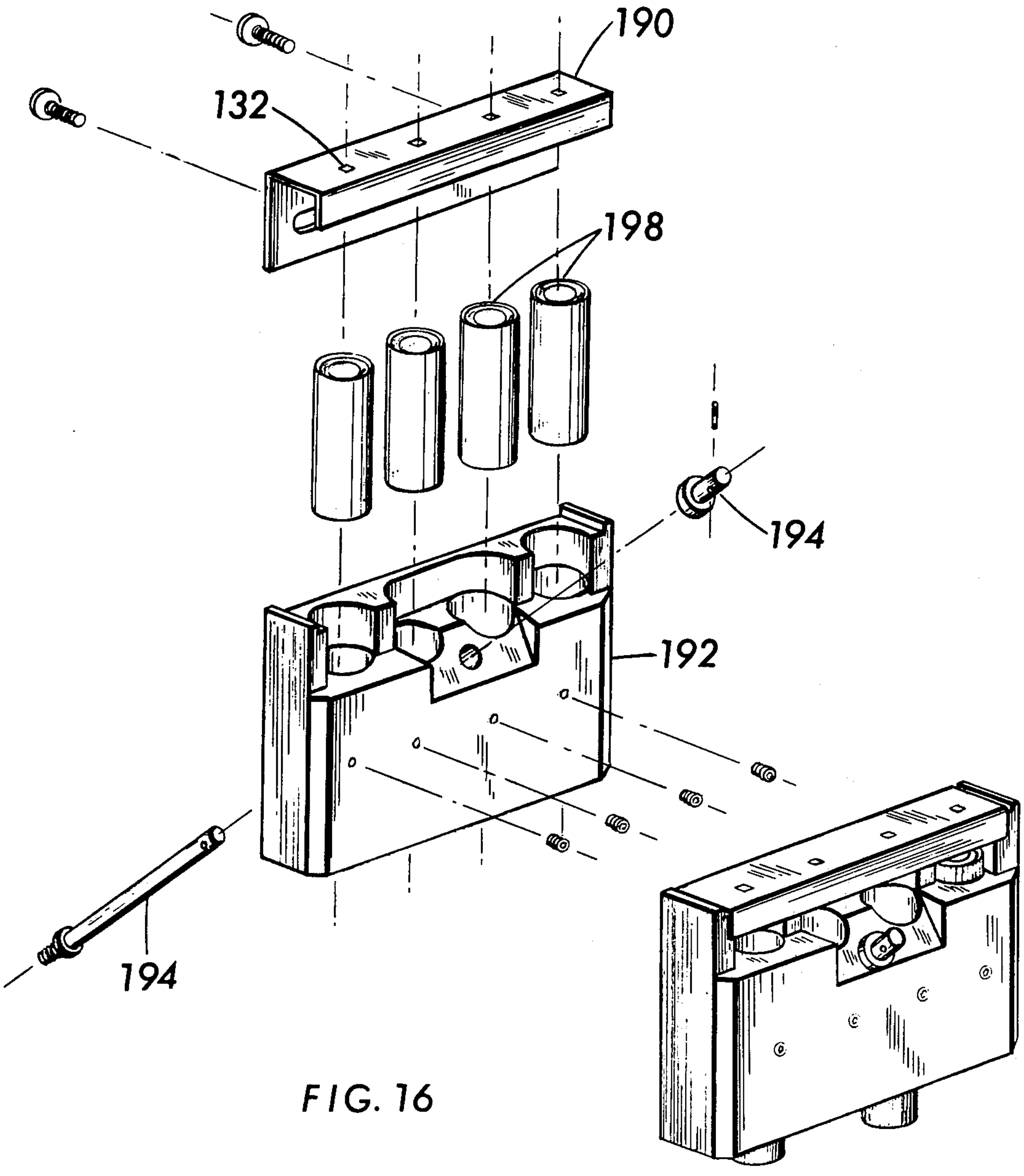
FIG. 16 is an exploded perspective view of a component of the device shown in FIGS. 9 and 10.

According to a feature of the invention, the projection lenses of different focal lengths are mounted in an interchangeable "lens pack" which is shown at 192 in FIGS. 9 and 10, and more clearly in FIGS. 11 and 16.

As it is shown in FIG. 11, the lens carriage 114 is mounted on roller bushings 186, 188 which are pressed into the body of the carriage 114. The bushings slide on rails 22, 24 which are mounted on the disc-carriage 214. The lens pack 192 is accurately positioned against a flat surface 115 with the aid of a projection 196 from the body of the lens carriage 114 and is secured in place by a screw 194. One of the lenses of the lens pack is shown at 198. It should be noted, as shown in FIG. 11, that the rail 24 is located vertically above the rail 22 instead of side-by-side as in FIG. 1.

Referring to FIG. 9, limit switches 67 and 68 are mounted at the ends of the path of travel of the disc carriage 214. The position of the carriage 214 on the guide rails 36 and 38 is determined by counting pulses produced by the stepping motor 162 in the manner described in detail in U.S. Pat. No. 3,590,705. However, if that counting system should fail, so that the carriage 214 travels too far to the left or right, one of the limit switches will be operated to turn off the drive motor or otherwise correct the trouble.

Limit switches 69 and 70 similarly are provided at the limits of travel of the lens carriage 114 to prevent it from travelling too far.

A preferred form of the locking mechanism will now be described in relation to FIGS. 11, 12 and 13. The locking rack is similar to the rack 40 of FIG. 1 and is shown at 164 attached to the base 200 of the lens carriage (see FIGS. 10, as well as FIGS. 11 through 13). A locking pawl is shown at 166 and comprises several teeth cut out from the end of a plunger 168 (FIG. 11) which is slidably mounted on the lens carriage 114 through a ball bushing 170. The purpose of the bushing 170 is to provide for easy motion of plunger 168 with virtually zero play, because it is necessary to positively lock the lens carriage to the disc carriage during the normal operation of the machine.

Still referring to FIG. 11, plunger 168 is integral with a rack section 172 engaging teeth 173 of a pinion 174. The plunger 168 is urged towards rack 164 by a compression spring 204 secured by a threaded plug 205.

Figure 12:
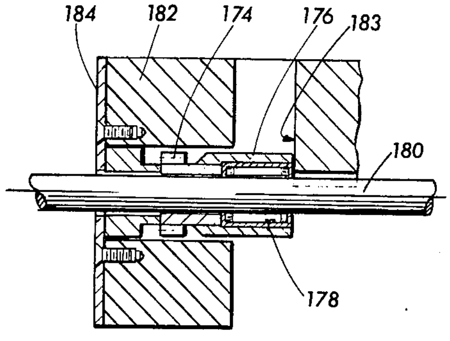
FIG. 12 is a cross-sectional view taken along line 12—12 of FIG. 11.
Figure 13:
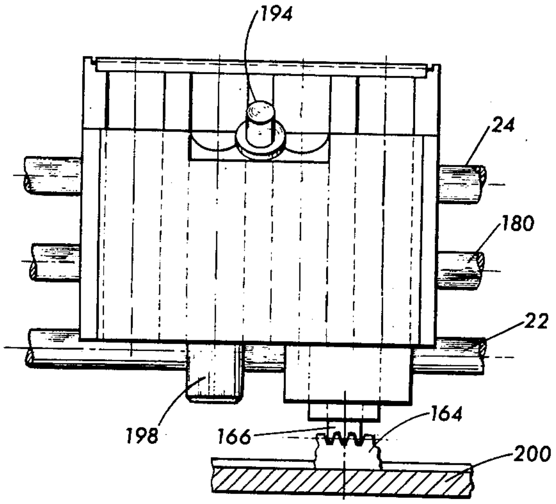
FIG. 13 is an elevation view of a component of the device shown in FIGS. 9 through 12.

As shown in FIG. 12 which is a partial cross-sectional view taken along line 12-12 of FIG. 11, pinion 174 is integral with a sleeve 176 located in a cavity of the lens carriage body 182 in which it can rotate freely but is prevented from longitudinal motion by a wall 183 at one end and a cover 184 at the other end. A commercially available roller one-way clutch shown at 178 and is press-fitted into a recess of sleeve 176 so that any rotation of the outer ring of the clutch will cause a rotation of sleeve 176 and, consequently of pinion 174, thus lifting plunger 168 to disengage pawl 166 from rack 164. One important feature of the novel arrangement described is that the clutch 178 can slide freely along control rod 180 in the normal operation of the machine. Rod 180, as shown in FIG. 9, can be rotated by a rotary solenoid 50 through gears 228. The rotation of rod 180 causes the clutch rollers to be jammed between their cam-shaped outer-race and rod 180, thus preventing any longitudinal displacement of the lens carriage 114 along rod 180 prior to lifting the locking plunger and releasing the lens carriage from the disc-carriage. Thus, each time solenoid 50 is energized, the lens carriage is locked in space as the clutch rollers squeeze rod 180, thus creating considerable friction to prevent any longitudinal motion prior to and during the time the lens carriage is being locked to or freed from the disc carriage by operation of the rack 164 and pinion 166.

In a machine embodying the present invention the distance from the matrix disc to the photographic film 210 (FIG. 14) can be considerably reduced compared to other existing machines. This is made possible by the simplification of the lens changing mechanism and the fact that the lenses travel with the disc to space characters on the film. Also helpful is the use of small master characters on the matrix disc combined with small lenses of short focal lengths. In a machine presently manufactured, the distance 226 (FIG. 14) from the disc to the film 210 is only 125 millimeters, and each lens is located in a small tube (e.g. 198) of approximately 10 mm diameter. Each tube is properly in the lens pack block 192 in order to have all the lenses in focus when the pack is in position.

A four-lens lens-pack 192 is shown in greater detail in the exploded view of FIG. 16 in which reference numerals indicate the same or similar parts described in relation to other figures. Because of the small size of the lenses used in the machine, such lens packs are of relatively low cost, light weight and very easily removable from the lens carriage: they are therefore an important feature of the preferred embodiment of the invention.

A cover 190 (FIGS. 11 and 16) is attached to each lens pack. The cover 190 is provided with a series of apertures 132 (also see FIG. 9), there being one aperture 132 per lens. Each aperture is just large enough to allow the rays emerging from the largest character of the selected row to go through. The cover 132 is located close to the disc 2 to more easily mask the unwanted rows. This masking arrangement is required because the flash lamp 202 (FIG. 14) through condensing lenses 208 and mirror 206 illuminates, when flashed, an area extending across all of the rows of characters on the disc. The width of the illuminated area is equal to the width of one character area. Referring to FIG. 2 again, for example, the light from one flash of the flash lamp would illuminate all of the "N"s in each of the four rows 28, 30, 32 and 34. Therefore, it is the purpose of cover 190 to block out all of the light from the condensing system that would project an undesired row of characters. Since the holes 132 are spaced farther from one another than the width of the flash light beam, light can pass through only one of the holes 132 at a time.

The small size of the holes 132 relative to the lenses in the lens pack correctly illustrates the fact that light passes into the lenses "on axis." That is, the center of the character area opposite the lens always is aligned with the central axis of the lens. This helps to keep the quality of the character images high by avoiding or minimizing many sources of image degradation, such as distortion, field curvature, astigmatism, and coma.

The above description of the invention is intended to be illustrative and not limiting. Various changes or modifications in the embodiments described may occur to those skilled in the art and these can be made without departing from the spirit or scope of the invention.

I claim:

1. In a photographic type composing machine, the combination of a character matrix bearing a plurality of styles of characters, support means for defining a recording surface, lens means for projecting character images from said matrix towards said recording surface with a selectively variable size, drive means for driving said matrix relative to said recording surface, locking means for maintaining said matrix and said lens means in fixed relationship to one another so as to travel together during type composition and for permitting said matrix and said lens means to move relative to one another, and control means for selectively operating said locking means and said drive means to move said matrix and said lens means relative to one another for changing the size and/or style of the characters being composed.

2. In a photographic type composing machine, the combination of a character matrix bearing a plurality of styles of characters, support means for defining a recording surface, lens means for projecting character images from said matrix towards said recording surface with a selectively variable size, drive means for driving said matrix relative to said recording surface, and locking means for maintaining said matrix and said lens means in fixed relationship to one another so as to travel together during type composition and for permitting said matrix and said lens means to move relative to one another for changing the size and/or style of the characters being composed, said drive means comprising motive means for moving said matrix past said recording surface for character spacing purposes during type composition, means for disabling said locking means to enable style and/or size changes, holding means for holding said lens means stationary during style and/or size changes, means for actuating said motive means while said lens means is held stationary to effect motion of said matrix and lens means relative to one another, and control means for disabling said holding means and re-enabling said locking means in order to continue type composition after the style and/or size change has been made.

3. In a photographic type composing machine, the combination of a character matrix bearing a plurality of styles of characters, support means for defining a recording surface, lens means for projecting character images from said matrix towards said recording surface with a selectively variable size, drive means for moving said matrix and said lens means relative to one another for changing the size and/or style of characters being composed, and locking means for maintaining said matrix and said lens means in fixed relationship to one another during type composition, motive means for moving said matrix past said recording surface for character spacing purposes during type composition, means for disabling said locking means to enable style and/or size changes, holding means for holding said lens means stationary during style and/or size changes, means for actuating said motive means while said lens means is held stationary to effect motion of said matrix and lens means relative to one another, and control means for disabling said holding means and re-enabling said locking means in order to continue type composition after the style and/or size change has been made, said control means including means for reversing said motive means after disabling said holding means and re-enabling said locking means but before continuation of type composition in order to bring the matrix and lens means to a position for projection of the next character.

4. In a photographic type composing machine, the combination of a character matrix bearing a plurality of styles of characters, support means for defining a recording surface, lens means for projecting character images from said matrix towards said recording surface with a selectively variable size, drive means for moving said matrix and said lens means relative to one another for changing the size and/or style of characters being composed, locking means for maintaining said matrix and said lens means in fixed relationship to one another during type composition, means for holding said recording surface stationary during type composition said drive means being adapted to move the combination of said matrix and said lens means relative to said recording surface to space characters on said surface during type composition, said lens means comprising a lens holder, a plurality of lenses mounted in a linear array in said holder, said array extending in the direction of the character spacing motion created by said drive means, and control means for selectively actuating said drive means and said locking means.

5. A device as in claim 4 in which said matrix is a continuously rotatable disc with a plurality of concentric rows of characters, the characters in at least two adjacent rows being different, mounting means for mounting said lens holder to be movable linearly in said direction of character spacing motion and transversely of said rows of characters to selectively align one of said lenses with one of said rows, and an aperture mask forming an opaque cover over the entrances to said lenses adjacent said disc, said mask having a plurality of holes, one for each lens, each hole being aligned with the central axis of its associated lens, each aperture being substantially smaller than the diameter of its associated lens and at least slightly larger than the character area for characters on said disc.

6. A device as in claim 4 including lens holder support means and easily releasable means for securing said holder to said support means to facilitate changing the entire array of lenses.

7. In a photographic type composing machine, the combination of a character matrix bearing a plurality of styles of characters, support means for defining a recording surface, lens means for projecting character images from said matrix towards said recording surface with a selectively variable size, drive means for moving said matrix and said lens means relative to one another for changing the size and/or style of characters being composed, and locking means for maintaining said matrix and said lens means in fixed relationship to one another during type composition, said lens means comprising a plurality of relatively short focal-length lenses positioned to project characters from said matrix onto said recording surface, and said support means being adapted for supporting said recording surface adjacent said lenses and directly in the path of light rays emerging therefrom, and control means for selectively actuating said drive means and said locking means.

8. In a photographic type composing machine, the combination of a character matrix bearing a plurality of styles of characters, support means for defining a recording surface, lens means for projecting character images from said matrix towards said recording surface with a selectively variable size, drive means for moving said matrix and said lens means relative to one another for changing the size and/or style of characters being composed, locking means for maintaining said matrix and said lens means in fixed relationship to one another during type composition, said drive means being adapted to move said matrix and lens means and said recording surface relative to one another during type composition in order to space characters on said surface, a translation carriage for supporting said matrix to move parallel to said recording surface, a lens carriage for movably supporting said lens means on said translation carriage adjacent said matrix, a flash lamp mounted on said translating carriage with said matrix between said flash lamp and said lens means, and control means for selectively actuating said drive means and said locking means.

9. A photocomposing method comprising the steps of providing temporarily a character projection unit consisting of character matrix and variable-magnification projection lens means movably mounted with respect to said matrix, providing locking means, drive means and control means for selectively actuating said locking means and drive means, and operating said control means for locking said lens means into a fixed position relative to said matrix so as to project onto a radiation-sensitive recording surface character images of a selected style and/or size, for moving said projection unit relative to a radiation-sensitive recording surface while projecting character images to space characters on said surface, for unlocking said lens means from said matrix, and for moving said lens means and matrix relative to one another in order to change the size and/or style of characters being composed.

10. A method as in claim 9 which said projection unit moving step comprises moving said matrix with said lens means connected thereto, said lens means-matrix moving step comprising holding said lens means while moving said matrix, and including the further step of re-locking said lens means and matrix in a new fixed position relative to one another for further type composition.

11. A method as in claim 10 including the step of providing a reverse movement of the projection unit after said re-locking step in order to position said projection unit in a proper location for projecting the next character onto said surface.

12. A method as in claim 9 in which said lens means comprises a plurality of lenses of different focal lengths, and said matrix bears characters in a plurality of arrays of different styles, the step of encoding each of the lenses and arrays and arranging the lenses with respect to the arrays so that the displacement of said matrix relative to said lens means represents the sum of the codes for the selected array and the selected lens, adding together the codes for the style and the type size to be selected, and controlling the step of moving said lens means and matrix relative to one another according to said sum.

13. A method as in claim 12 including the step of storing the sum of said codes for each style and size selection, comparing that sum with the sum of the codes for a new style-size combination, and moving said lens means and matrix relative to one another by a distance proportional to the absolute difference between the new and old sums and in a direction dependent upon which sum is the greater.

14. A method as in claim 13 involving a change of type size and including the step of storing the code value for the old lens, comparing it with the code value or the new lens, and returning said projection unit, after having re-locked the lens means and matrix together, by a distance proportional to the difference between the new and old lens code values.

15. In a photocomposing machine, the combination of a support structure, a translating carriage movably mounted on said support structure, means on said support structure for defining a photosensitive character recording surface, a character matrix mounted on said translating carriage, lens means movable relative to said matrix in the direction of motion of said translating carriage to change the size of character images projected by said lens means from said matrix to said recording surface, locking means for selectively locking said lens means to travel in fixed relationship with said translating carriage during the recording of characters on said recording surface, and control means for selectively enabling said locking means.

16. A device as in claim 15 in which said lens means includes a plurality of lenses of different focal lengths, lens mounting means for holding said lenses in a linear array extending in the direction of motion of said translating carriage, the distance of each lens from said recording surface being a function of its focal length.

17. A device as in claim 16 including a lens carriage slidably mounted on said translating carriage to move in said direction of motion, said lens mounting means being secured to said lens carriage, holding means on said support structure for selectively gripping said lens carriage to hold said lens carriage in place, guide rails for guiding said translating carriage parallel to said recording surface, and drive means for driving said translating carriage along said guide rails.

18. A device as in claim 15 in which said matrix is a horizontal continuously rotatable disc bearing concentric rows of characters of different styles, a flash lamp vertically above said disc and secured to said translating carriage, said lens means comprising a linear array of lenses in vertical tubular housings on a lens carriage slidably mounted below said disc on said translating carriage, said location for said recording surface being adjacent and directly below said lenses, a stepping motor drivably coupled to a drive screw, a drive nut mating with said screw and secured to said translating carriage, said locking means comprising electromagnetic clutch means for selective engagement between said carriages to lock them together.

19. A device as in claim 18 in which said clutch means includes opposed racks on each of said carriages, a solenoid for pulling one of said racks away from the other to disengage the carriages, said one rack being slidably mounted above the other rack.

20. A device for a photocomposing machine having character presentation means for presenting character images in sequence for projection onto a radiation-sensitive surface, character sizing means for determining the size of the characters composed on said surface, said sizing means comprising a support member, a linear array of lens holding holes in said support member, a plurality of lenses of different focal lengths mounted in said holes, means for holding said support member with a selected one of said lenses in the projection path of said character images so that said projection path is always substantially perpendicular to said surface, and means for releasably securing said support member to said holding means, said character presentation means including a rotatable character carrier having thereon a character array comprising a plurality of rows of characters, the distance between adjacent ones of said lens holding holes being greater than the distance between the first and last ones of said rows in said array, means for movably mounting said holding means to permit serial movement of said lenses transversely of said rows, flashlamp means positioned and dimensioned to flash light through one character in each row simultaneously, and an opaque aperture mask adjacent said character carrier covering said lens holding holes with a central opening over each hole, said opening being smaller than said lens holding hole but as large as the character areas on said disc.

21. A device as in claim 20 in which the characters illuminated by said flash lamp are aligned along a tangent to a circle of a diameter substantially less than that of said disc.

22. A matrix disc for photocomposition, said disc bearing characters in concentric arrays, the characers in adjacent arrays being aligned with one another along the line tangent to a circle concentric with said arrays and having a diameter substantially less than that of said disc, said disc including a hub area located centrally on said disc and having a substantial area, said circle being of greater diameter than said hub area.

23. A disc as in claim 22 in which the characters in adjacent arrays are of different styles and are aligned along said line as a baseline, the characters which are so aligned being corresponding characters of different styles.

24. In a photocomposing machine, the combination of a matrix disc bearing a plurality of concentric arrays of characters, disc support means for rotatably supporting said disc, a holder with a plurality of lenses arranged linearly in said holder, holder support means to move in the direction of said linear array, transversely of said concentric arrays of characters, and in the direction of a line tangent to a circle concentric with said arrays of characters and whose diameter is substantially smaller than that of said disc, drive means for spinning said disc, said drive means including a hub portion extending from said one surface of said disc and located centrally thereof, said circle being greater in diameter than said hub portion.

25. A device as in claim 24 in which said disc support means is adapted to support said disc parallel to a support surface for photosensitive material to record character images, said holder support means is adapted to support said holder between said disc and said surface, and flash lamp support means for supporting a flash lamp adjacent the surface of said disc opposite to said one surface.

26. In a photocomposing machine comprising a character matrix bearing a plurality of arrays of characters, character projection means for projecting images of said characters onto a recording surface, character spacing means for spacing said images on the recording surface to form lines of character images, a drive motor coupled to drive said character spacing means, array selection means for selecting characters from a desired array to be projected on said recording surface, and coupling means for selectively coupling and uncoupling said array selection means with said drive means to operate said array selection means.

27. A device as in claim 26 including mounting means for mounting said array selection means for linear motion between a plurality of array selection positions, means for mounting said character spacing means for linear motion to space characters on said recording surface, the paths of motion of said character spacing means and said array selection means being parallel to one another.

28. A device as in claim 27 in which said matrix is a round, rotatable character carrier, said arrays comprising concentric rows of characters on said matrix.

29. A device as in claim 26 in which the characters in said arrays are of a plurality of styles, and in which said coupling means is adapted to couple and uncouple said array selection means with said character spacing means and thereby couple and uncouple said array selection means with said drive motor.

30. A device as in claim 26 including a stationary support, a matrix carriage mounted to move relative to said support, said matrix being mounted on said carriage, said array selection means comprising a mask with at least one aperture, said mask being mounted to move with said matrix, said coupling means being adapted to couple said mask first to said matrix carriage and then to said stationary support.

31. A photocomposing machine comprising a character matrix bearing a plurality of characters, character projection means for projecting images of said characters onto a recording surface, character spacing means for spacing said images on the recording surface to form composed lines of characters, a drive motor coupled to drive said character spacing means, size changing means for changing the size of the character images projected from said matrix, and coupling means for selectively coupling and uncoupling said size changing means with said drive means to operate said size changing means.

32. A device as in claim 31 in which said coupling means is adapted to couple and uncouple said size changing means with said character spacing means and thereby couple and uncouple said size changing means with said drive means, and means for mounting said size changing and character spacing means to travel in parallel paths.

33. A device as in claim 32 including a stationary support, and in which said character spacing means comprises means for moving said matrix relative to the recording surface, and size changing means comprising a holder, a linear array of lenses in said holder, and mounting means for mounting said holder to move with said matrix, said coupling means comprising a clutch to alternatively secure said holder in fixed relation to said matrix, and to release said holder from said matrix and secure it to said stationary support.

34. A device as in claim 31 in which said size changing means includes lens means for focusing character images on said recording surface at a selected size, said lens means being adapted to move with said character spacing means during type composition, and to move relative to said character spacing means to change said selected size, said coupling means being operable to couple said lens means to said drive motor to move with said character spacing means during type composition, and to uncouple said lens means from said motor during size changes.

35. A photocomposing machine comprising a character matrix bearing a plurality of styles of characters, character projection means for projecting images of said characters onto a recording surface, character spacing means for spacing said images on the recording surface to form lines of type composition, a drive motor coupled to drive said character spacing means, style selection means for selecting from said styles on said matrix characters of a desired style to be projected on said recording surface, size changing means for changing the size of the character images projected from said matrix, and coupling means for selectively coupling and uncoupling said style selection and size changing means with said drive means to operate said style selection and size changing means.

36. A device as in claim 35 in which said size changing means includes a holder, a plurality of lenses in said holder, a mask covering said lenses, said mask having a plurality of apertures, each being on-axis with one of said lenses, means for mounting said holder to move relative to said matrix in a path parallel to the motion of said character spacing means, including a stationary support, and in which said character spacing means comprises means for moving said matrix relative to the recording surface, said coupling means comprising a clutch for first coupling said holder to said matrix, and then releasing the first-named coupling and forming a second coupling of the holder to said stationary support.

37. A device as in claim 36 in which said matrix is a rotatable member with a plurality of concentric rows of characters of different styles, said character projection means comprising a flash lamp mounted to move with said matrix and produced a narrow light beam spanning a plurality of said rows, said mask and holder being positioned between said matrix and the recording surface, the spacing between adjacent ones of said apertures being greater than the width of said light beams.

38. In a photocomposition machine, the combination of character projection means for projecting character images towards a recording surface, a drive motor, a spacing carriage for spacing characters from one another on said recording surface, a driving member coupled to said drive motor and said spacing carriage, a lens carriage, lens means mounted on said lens carriage for projecting images from said character projection means to said recording surface with a selectively variable size, coupling means for coupling and uncoupling said lens carriage to said driving member, and control means for causing said coupling means to selectively couple and uncouple said lens carriage to said drive member and cause said drive motor to drive said spacing carriage together with said lens carriage to space characters on said surface and change the size of images projected onto said recording surface.

39. A device as in claim 38 in which said control means includes means for holding said lens means stationary while said spacing carriage and driving member are moving.

40. In a photocomposing machine, the combination of character placement means for directing character images onto a photosensitive recording surface, character spacing means, including a drive motor drivably coupled to said character placement means to space said character images from one another on said recording surface, lens means for focusing character images on said recording surface at a selected size, said lens means being adapted to selectively move with said character placement means or remain stationary in order to space characters or to change said selected size, coupling means for selectively drivably coupling said lens means to said drive motor to travel with said character placement means, and for selectively uncoupling said lens means from said drive motor, and control means for selectively operating said drive motor and said coupling means.

41. A device as in claim 40 in which the paths of movement of said character placement means and said lens means are parallel to one another, and said coupling means comprises a clutch and control means for selectively actuating said clutch.

42. A device as in claim 40 including a character matrix with a plurality of character arrays thereon, array selection means for enabling the selection of characters to be recorded from one of said arrays, said array selection means including said drive motor and means for creating motion of said lens means and said matrix relative to one another to position said lens means in the optical path of characters projected from one of said arrays.

43. A device as in claim 42 in which said character placement means includes said matrix, and said motion creating means includes said coupling means and control means for operating said coupling means to cause said relative movement of said lens means and said matrix.

44. A device as in claim 40 inlcuding an elongated drive member drivably coupled to said drive member, said placement means being permanently drivably coupled to said drive member, said lens means being temporarily couplable to said drive member by means of said coupling means.

* * * * *

UNITED STATES PATENT AND TRADEMARK OFFICE

CERTIFICATE OF CORRECTION

PATENT NO. : 4,162,846
DATED : July 31, 1979
INVENTOR(S) : Louis M. Moyroud

It is certified that error appears in the above-identified patent and that said Letters Patent are hereby corrected as shown below:

In the heading, item 30, change "Oct. 1, 1977 [GB] United Kingdom ......... 42636/77" to --October 1, 1974 [GB] United Kingdom ......... 42636/74--.

Claim 4, line 66, insert --,-- after "composition--.

Claim 10, line 18, add --in-- after "9".

Claim 22, line 4, change "characers" to --characters--; line 6, change "the" to --a--.

Claim 26, line 48, change "means" (second occurrence) to --motor--.

Claim 31, line 17, change "means" (second occurrence) to --motor--.

Claim 33, line 29, change "and" to --said--.

Claim 35, line 60, change "means" to --motor--.

UNITED STATES PATENT AND TRADEMARK OFFICE

CERTIFICATE OF CORRECTION

PATENT NO. : 4,162,846

DATED : July 31, 1979

INVENTOR(S) : Louis M. Moyroud

It is certified that error appears in the above-identified patent and that said Letters Patent are hereby corrected as shown below:

Claim 44, line 7, change "inlcuding" to --including--.

Signed and Sealed this

*Twenty-ninth* Day of *July 1980*

[SEAL]

*Attest:*

SIDNEY A. DIAMOND

*Attesting Officer* *Commissioner of Patents and Trademarks*